UNITED STATES PATENT OFFICE.

SAMUEL P. FINIGAN, OF CLEVELAND, OHIO.

OINTMENT COMPOSITION AND PROCESS OF MAKING SAME.

1,372,496.  Specification of Letters Patent.  Patented Mar. 22, 1921.

No Drawing.  Application filed February 9, 1920. Serial No. 357,291.

*To all whom it may concern:*

Be it known that I, SAMUEL P. FINIGAN, a citizen of the United States, residing at Cleveland, in the county of Cuyahoga and State of Ohio, have invented a certain new and useful Ointment Composition and Process of Making Same, of which the following is a specification.

The object of my invention is the production of a composition ointment or salve which possesses combined disinfecting, healing, and soothing qualities.

My composition consists of a mixture or compound of fats or greases, certain stimulating, antiseptic vegetable products, astringent mineral salts, resinous gum and bees-wax.

In preparing the composition I prefer to use the ingredients in about the following proportions—viz., one pound of mutton-tallow, one pound of lard, one pound of carrots, two ounces of bees-wax, two ounces of resin, and-one-and-one-half ounces of alum. Petrolatum may be substituted for the lard without materially changing the character of the composition, and a perfume essence may be added to give the product a pleasant odor.

The carrots are ground and cooked to a soft or mushy condition, the fats, gums, and mineral salts are heated until they are all melted, and the carrots are mixed with the other ingredients while the mixture is hot.

The ointment is non-poisonous, non-perishable, easy to apply, and possesses wonderful disinfecting, healing, and pain soothing properties.

What I claim is.

1. An ointment comprising a compound of substantially equal proportions of alum and resin, and a larger proportion of pulpy carrots, carried in a vehicle composed of substantially equal proportions of two animal greases and a smaller proportion of wax.

2. The process of making an ointment comprising the component elements as set forth, including the cooking of carrots to a mushy condition, heating to a melted consistency equal proportions of two animal greases, a smaller proportion of wax, and substantially equal proportions of alum and resin, then mixing the carrots in a proportion substantially equal to that of one of the aforesaid greases, with the combined other ingredients while the mixture is hot.

In testimony whereof I affix my signature.

SAMUEL P. FINIGAN.